United States Patent
Yang et al.

(10) Patent No.: US 10,200,939 B2
(45) Date of Patent: Feb. 5, 2019

(54) METHOD AND DEVICE FOR IDENTIFYING SECONDARY CELL ON BASIS OF DISCOVERY SIGNALS

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/514,792

(22) PCT Filed: Sep. 24, 2015

(86) PCT No.: PCT/KR2015/010088
§ 371 (c)(1),
(2) Date: Mar. 27, 2017

(87) PCT Pub. No.: WO2016/052925
PCT Pub. Date: Apr. 7, 2016

(65) Prior Publication Data
US 2017/0215133 A1     Jul. 27, 2017

Related U.S. Application Data

(60) Provisional application No. 62/058,672, filed on Oct. 2, 2014.

(51) Int. Cl.
| | |
|---|---|
| *H04W 48/16* | (2009.01) |
| *H04W 76/28* | (2018.01) |
| *H04B 7/06* | (2006.01) |
| *H04L 5/00* | (2006.01) |
| *H04W 24/08* | (2009.01) |
| *H04W 56/00* | (2009.01) |
| *H04W 72/12* | (2009.01) |

(Continued)

(52) U.S. Cl.
CPC .......... *H04W 48/16* (2013.01); *H04B 7/0626* (2013.01); *H04L 5/0051* (2013.01);
(Continued)

(58) Field of Classification Search
CPC ... H04W 48/16; H04W 76/048; H04W 24/08; H04L 5/0051
See application file for complete search history.

(56) References Cited

U.S. PATENT DOCUMENTS

| | | | |
|---|---|---|---|
| 2016/0262000 A1* | 9/2016 | Koorapaty | H04W 48/12 |
| 2016/0262100 A1* | 9/2016 | Larsson | H04W 52/0229 |
| 2016/0295500 A1* | 10/2016 | Liu | H04W 48/16 |

FOREIGN PATENT DOCUMENTS

KR     1020140095994     8/2014

OTHER PUBLICATIONS

Nokia Corporation, et al., "Requirements for UE Measurements Procedures in RRC_CONNECTED State for 3DL CA", R4-144682, 3GPP TSG-RAN WG4 Meeting #72, Aug. 2014, 9 pages.

(Continued)

*Primary Examiner* — Wei Zhao
(74) *Attorney, Agent, or Firm* — Lee Hong Degerman Kang Waimey

(57) ABSTRACT

One disclosure of the present specification provides a method for identifying a secondary cell on the basis of discovery signals. The method may comprise the step of receiving information on a discovery signal measurement timing configuration (DMTC) and a measurement cycle from a serving cell. The DMTC may include a DMTC periodicity. The measurement cycle may indicate the measurement cycle of an inactivated secondary cell (Scell) by subframe unit. The method may comprise the step of identifying the secondary cell. If DRX is used, the secondary cell is considered an intra-frequency cell, and the secondary cell is a small cell and identified based on discovery signals, the (Continued)

identification of the small cell can be performed in two hours.

12 Claims, 17 Drawing Sheets

(51) Int. Cl.
   *H04W 72/04* (2009.01)
   *H04W 84/04* (2009.01)
(52) U.S. Cl.
   CPC ....... *H04W 24/08* (2013.01); *H04W 56/0015* (2013.01); *H04W 72/1231* (2013.01); *H04W 76/28* (2018.02); *H04W 72/042* (2013.01); *H04W 72/0446* (2013.01); *H04W 84/045* (2013.01)

(56) References Cited

OTHER PUBLICATIONS

PCT International Application No. PCT/KR2015/010088, International Search Report dated Jan. 13, 2016, 3 pages.

Nokia Corporation, et al., "Requirements for UE Measurements Procedures in RRC_CONNECTED State for 3DL CA", R1-44682, 3GPP TSG-RAN WG4 Meeting #72, Aug. 2014, 9 pages.

NEC, "Views on inter-eNB coordination of DRS measurement timing configuration", R1-143149, 3GPP TSG RAN WG1 Meeting #78, Aug. 2014, 3 pages.

Huawei, et al., "Discussion on requirement of Cell/TP identification for SCE", R4-144487, 3GPP TSG-RAN WG4 Meeting #72, Aug. 2014, 11 pages.

CATT, "Measurement performance simulation for small cell based on DRS", R4-144272, 3GPP TSG-RAN WG4 Meeting #72, Aug. 2014, 6 pages.

3rd Generation Partnership Project; Technical Specification Group Radio Access Network; Evolved Universal Terrestrial Radio Access (E-UTRA); Physical Channels and Modulation (Release 10), 3GPP TS 36.211 V10.4.0, Dec. 2011, 101 pages.

3rd Generation Partnership Project; Technical Specification Group Radio Access Network; Evolved Universal Terrestrial Radio Access (E-UTRA); Physical Channels and Modulation (Release 10), 3GPP TS 36.211 V10.2.0, Jun. 2011, paragraph 6.11, 7 pages.

3rd Generation Partnership Project; Technical Specification Group Radio Access Network; Evolved Universal Terrestrial Radio Access (E-UTRA); Physical Channels and Modulation (Release 10), 3GPP TS 36.211 V10.1.0, Mar. 2011, paragraph 6.10.5, 7 pages.

* cited by examiner

METHOD AND DEVICE FOR IDENTIFYING SECONDARY CELL ON BASIS OF DISCOVERY SIGNALS

CROSS-REFERENCE TO RELATED APPLICATIONS

This application is the National Stage filing under 35 U.S.C. 371 of International Application No. PCT/KR2015/010088, filed on Sep. 24, 2015, which claims the benefit of U.S. Provisional Application No. 62/058,672, filed on Oct. 2, 2014, the contents of which are all hereby incorporated by reference herein in their entirety.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

However, if the small cell is densely deployed within the coverage of the macro cell, it may be difficult for a UE (User Equipment) to detect the small cell.

In order to solve the above mentioned problem, the small cell may a new DS (Discovery Signal) in addition to an existing PSS (Primary Synchronization Signal)/SSS (Secondary Synchronization Signal).

A UE can detect the small cell by using the discovery signal.

However, it has not been researched about how long it should take for a UE to finish detecting the small cell.

SUMMARY OF THE INVENTION

Accordingly, an object of the present invention is to solve the above-mentioned problems.

To achieve the foregoing aspect, there is provided a method for identifying a cell based on a discovery signal. The method may comprise: receiving, from a serving cell, a discovery signal measurement timing configuration (DMTC) and information on a measurement cycle. The DMTC may include a DMTC periodicity. The information on the measurement cycle may specify a cycle of subframes for measuring a secondary cell (Scell) which is deactivated. The method may comprise: identifying the secondary cell. If a discontinuous reception (DRX) is used, if the secondary cell corresponds to an intra-frequency, if the secondary cell corresponds to a small cell and is identified based on a discovery signal, the secondary cell may be identified within a second time duration, $T_{identify\_intra\_SCE}$. Here, $T_{identify\_intra\_SCE}=N*\max(\text{DMTC periodicity}, \text{a length of DRX cycle})+T_{Measurement\_Period\_Intra\_SCE}$. And, the $T_{Measurement\_Period\_Intra\_SCE}$ is a duration for a measurement on the intra-frequency and the N is an integer.

If the DRX is not used, the secondary cell may be identified within a first time duration based on the measurement cycle.

The identifying of the cell may include detecting and measuring the cell.

The DMTC periodicity may correspond to one of 40 ms, 80 ms and 160 ms.

The discovery signal may include one or more of a primary synchronization signal (PSS), a secondary synchronization signal (SSS), a cell-specific reference Signal (CRS) and a channel state information reference signal (CSI-RS).

The first time duration may be expressed as $T_{identify\_scc}$. Here, $T_{identify\_scc}=20*$the measurement cycle.

The measurement cycle may specify at least one cycle of 160 subframes, 256 subframes, 320 subframes, 512 subframes, 640 subframes, 1024 subframes and 1280 subframes.

To achieve the foregoing aspect, there is also provided a terminal for identifying a cell based on a discovery signal. The terminal may comprise: a radio frequency (RF) unit configured to receive, from a serving cell, a discovery signal measurement timing configuration (DMTC) and information on a measurement cycle. The DMTC may include a DMTC periodicity. The information on the measurement cycle may specify a cycle of subframes for measuring a secondary cell (Scell) which is deactivated. The terminal may comprise: a processor configured to identify the secondary cell. If a discontinuous reception (DRX) is used, if the secondary cell corresponds to an intra-frequency, if the secondary cell corresponds to a small cell and is identified based on a discovery signal, the secondary cell may be identified within a second time duration, $T_{identify\_intra\_SCE}$. Here, $T_{identify\_intra\_SCE}=N*\max(\text{DMTC periodicity}, \text{a length of DRX cycle})+T_{Measurement\_Period\_Intra\_SCE}$. And, the $T_{Measurement\_Period\_Intra\_SCE}$ is a duration for a measurement on the intra-frequency and the N is an integer.

In accordance with the disclosure of the present specification, the above mentioned problem will be solved.

DESCRIPTION OF EXEMPLARY EMBODIMENTS

Figure 1:
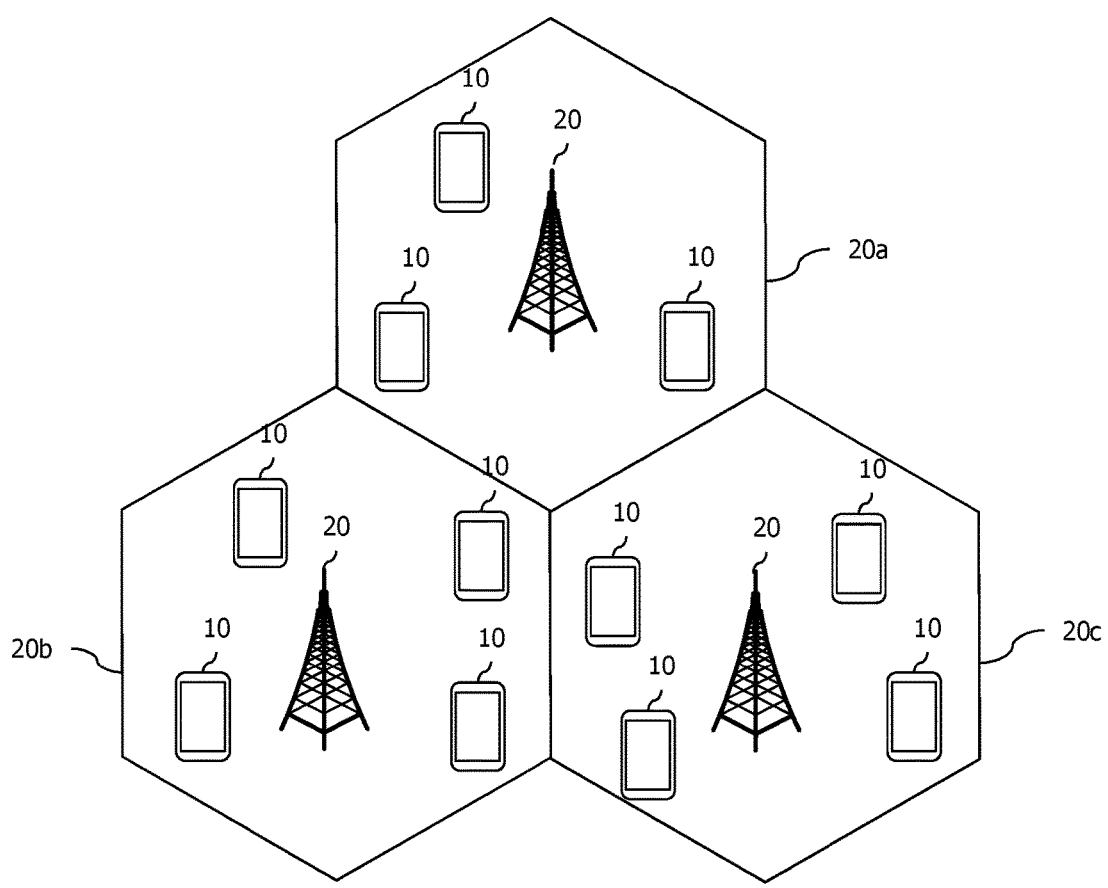
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
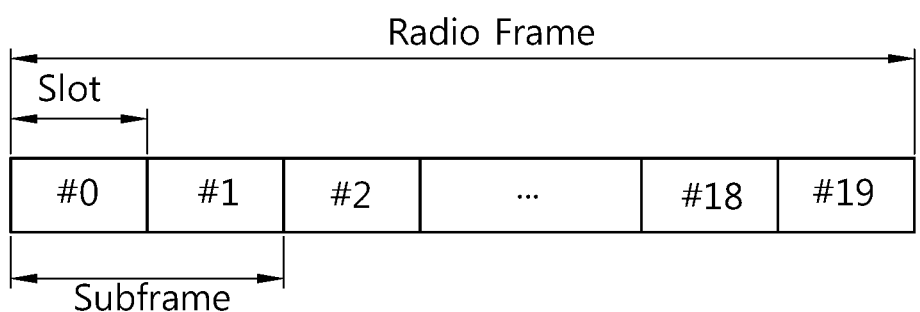
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
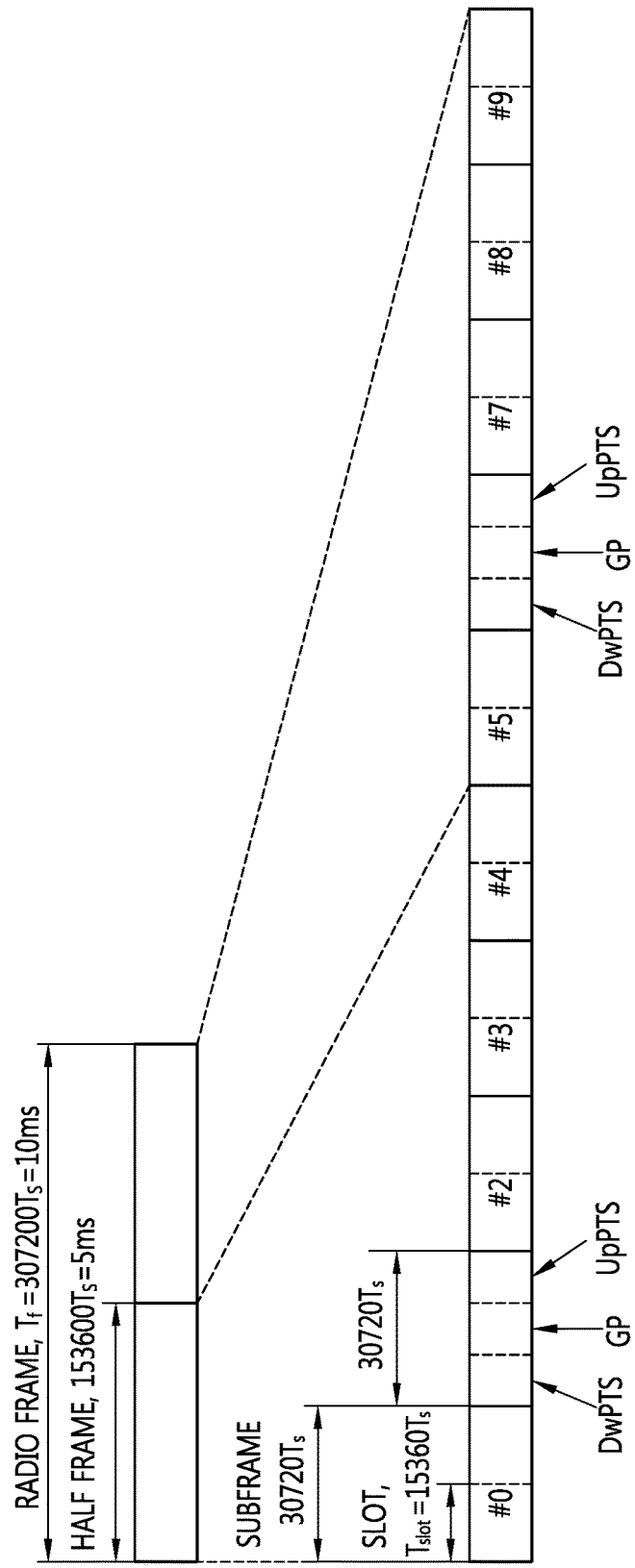
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
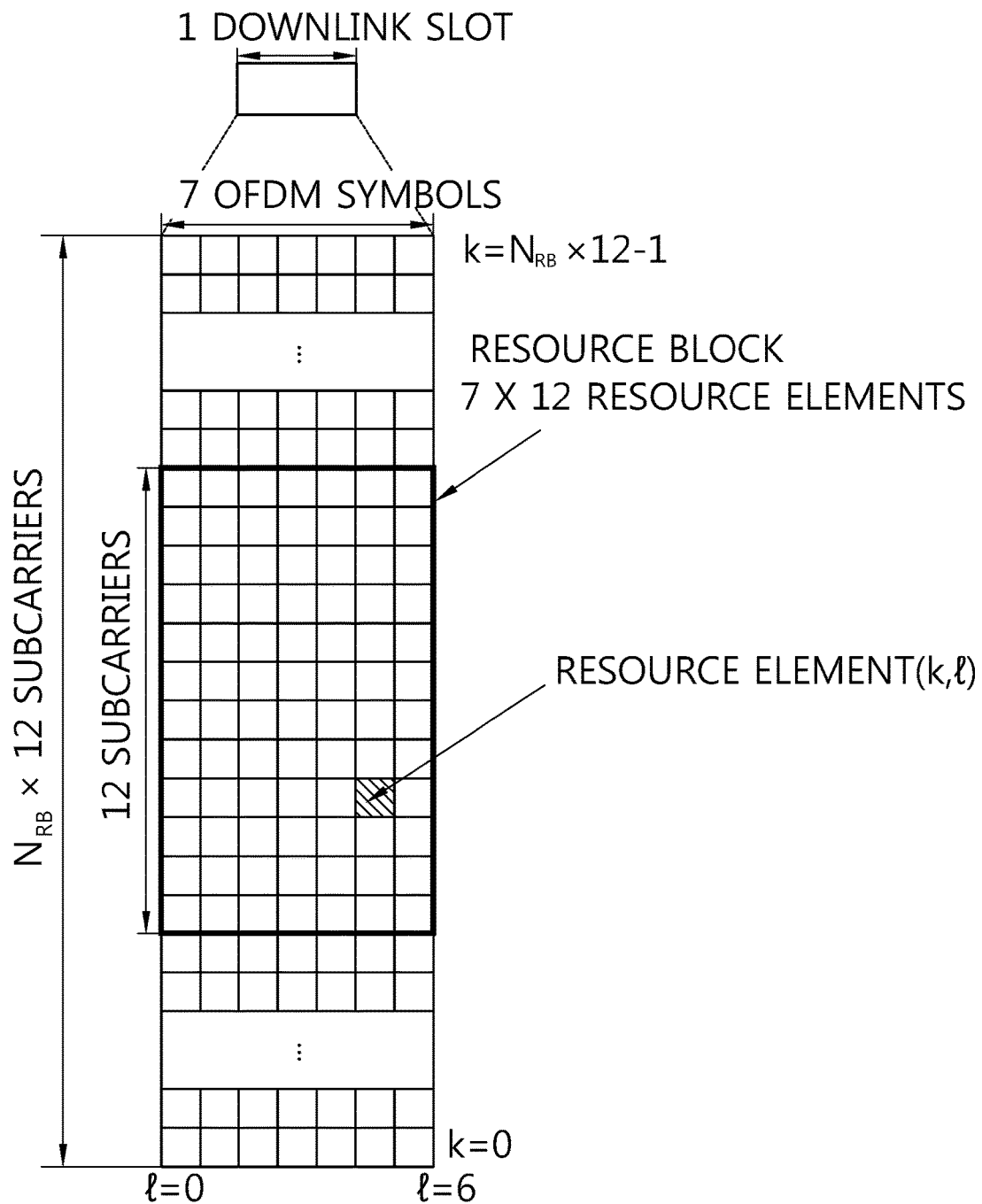
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
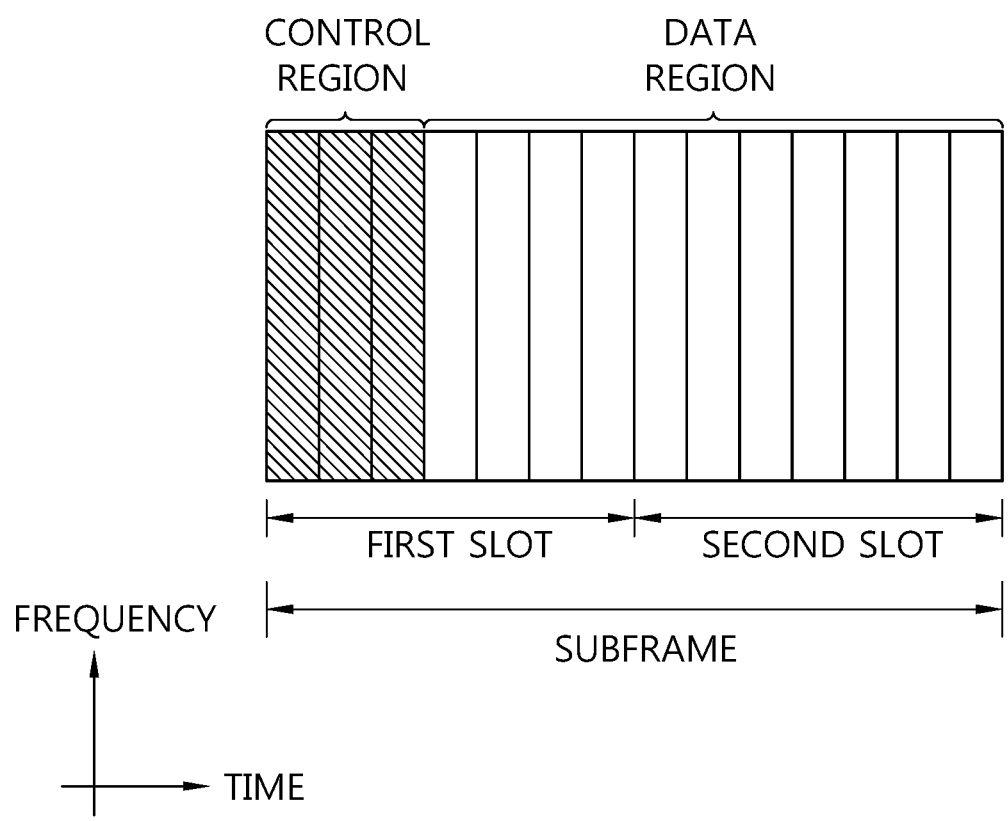
FIG. 5 illustrates a structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
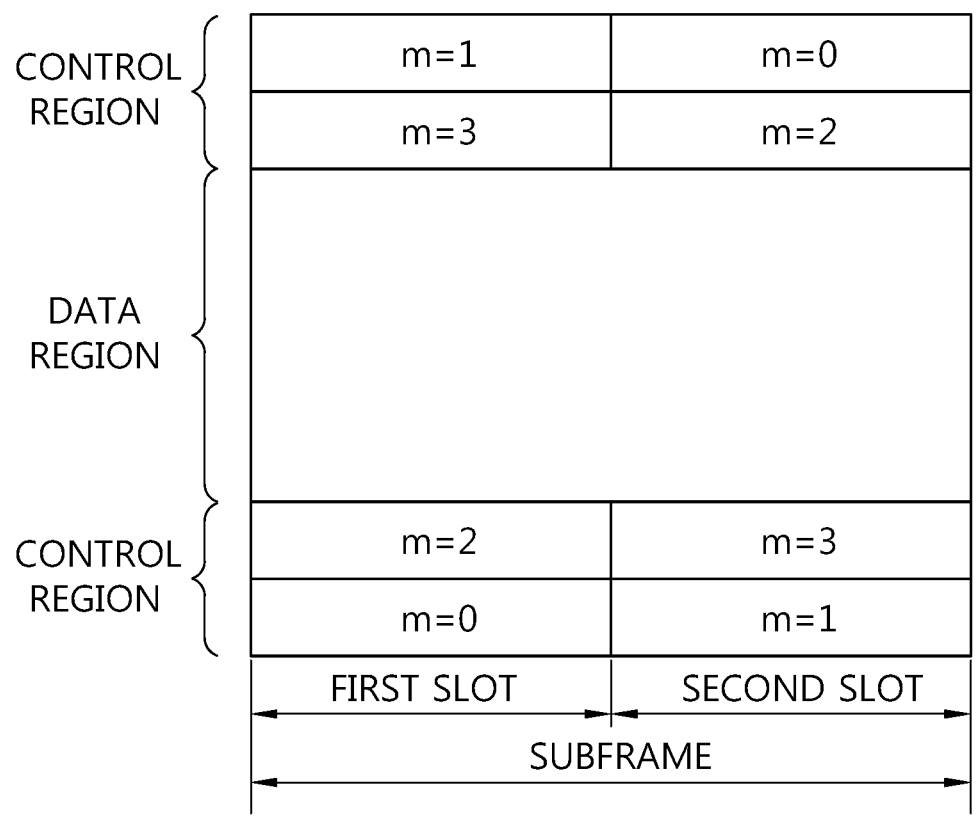
FIG. 6. illustrates a structure of an uplink subframe in 3GPP LTE.
Figure 6:
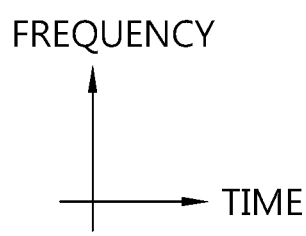

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The UE may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Synchronization Signal>

In LTE/LTE-A systems, synchronization with a cell is obtained through a synchronization signal (SS) in a cell search process.

The synchronization signal is described in detail below with reference to FIG. 7.

Figure 7:
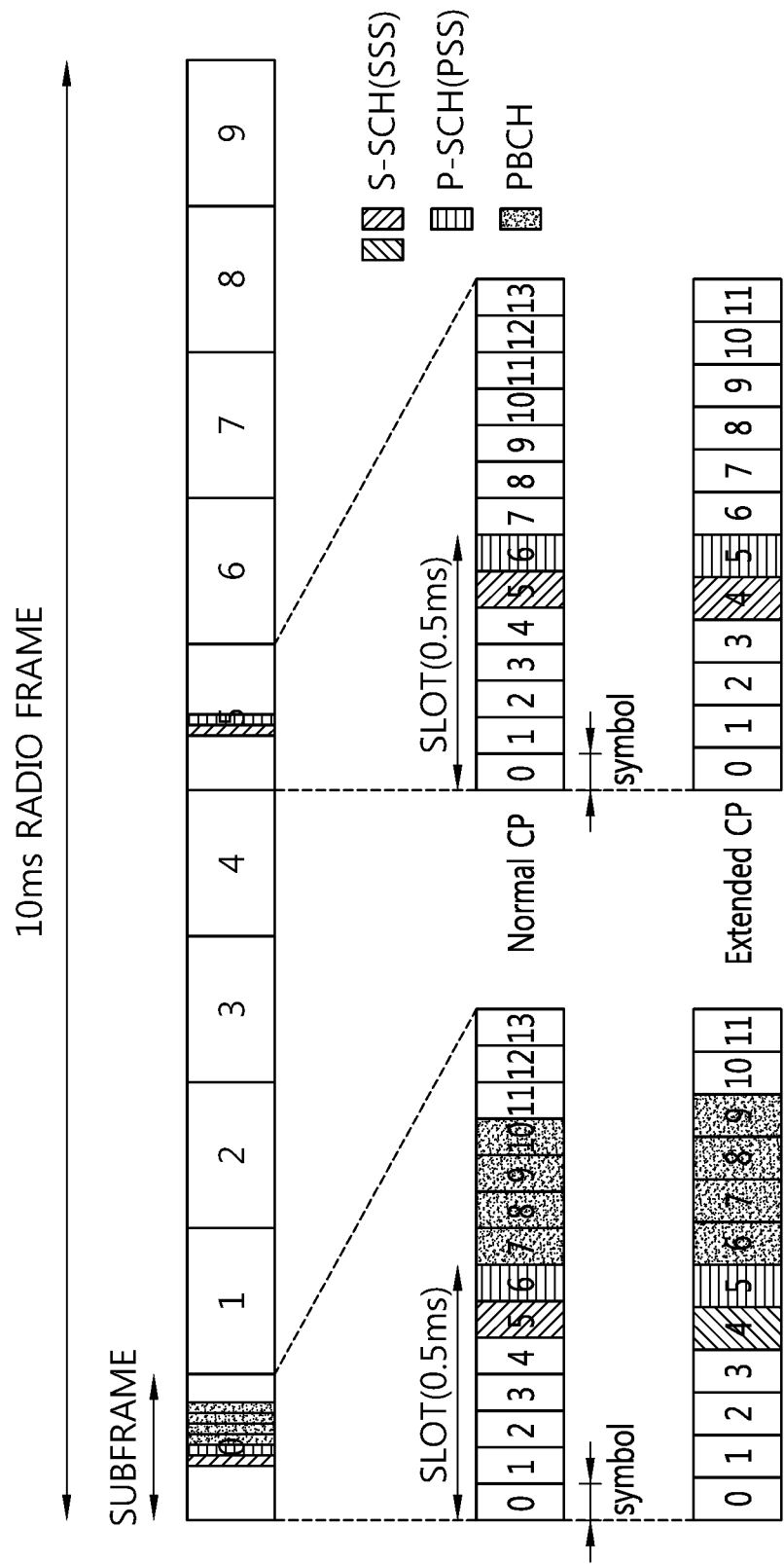
FIG. 7 illustrates a frame structure for transmitting a synchronization signal in a FDD frame.

FIG. 7 Illustrates a Frame Structure for the Transmission of a Synchronization Signal in an FDD Frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain OFDM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a subframe No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combinaiton of three PSSs and 168 SSSs. A PBCH (physical broadcast channel) is transmitted in the first 4 OFDM symbols of the first slot. A synchronization signal and PBCH are transmitted within center 6 Rbs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
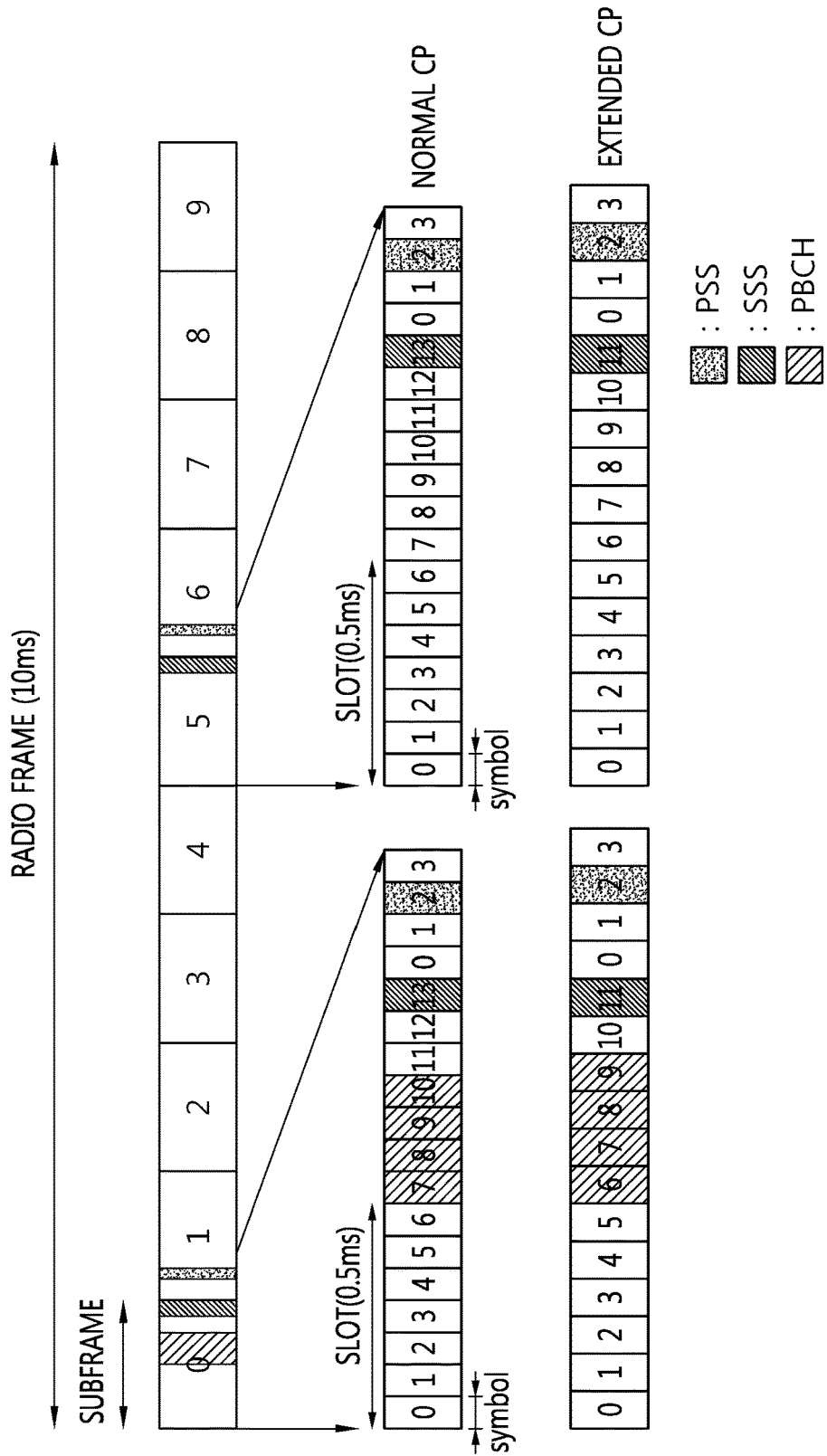
FIG. 8 illustrates a frame structure for transmitting a synchronization signal in a TDD frame.

FIG. 8 Illustrates an Example of a Frame Structure for Sending a Synchronization Signal in a TDD Frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distored and changed while it is transmitted through a radio channel. Accordingly, a reference signal is required in order to demodulate such a transmission information without an error.

The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
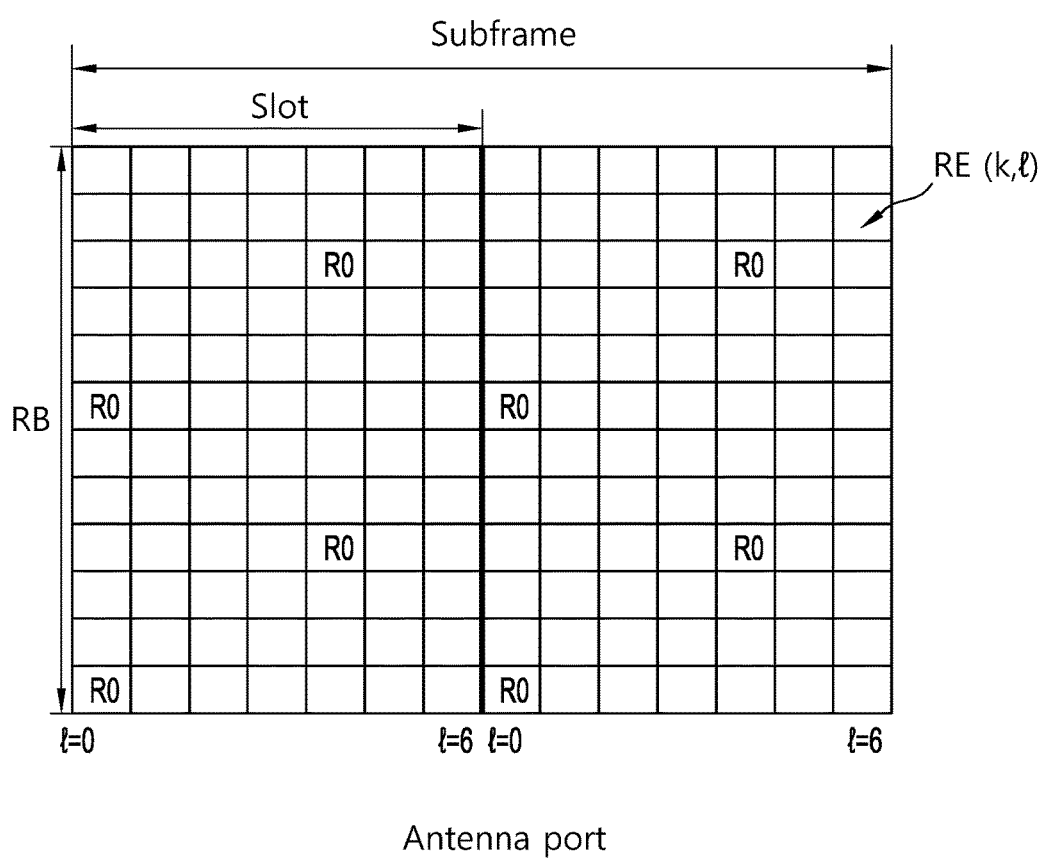
FIG. 9 illustrates an exemplary pattern with which a CRS is mapped to a RB, if a base station uses a single antenna port.

FIG. 9 Illustrates an Exemplary Pattern with which a CRS is Mapped to a RB, if a Base Station Uses a Single Antenna Port.

Referring to FIG. 9, R0 illustrates a resource element (RE) to which a CRS transmitted by antenna port number 0 of the base station is mapped.

The CRS is transmitted in all downlink subframes in a cell supporting a PDSCH transmission. The CRS may be transmitted on the antenna port number 0 to 3.

The RE allocated to the CRS of a single antenna port can not be used for the transmission of other antenna ports, and should be configured as zero. Further, the CRS is only transmitted on a non-MBSFN (multicast-broadcast single frequency network) region in a MBSFN subframe.

Figure 10:
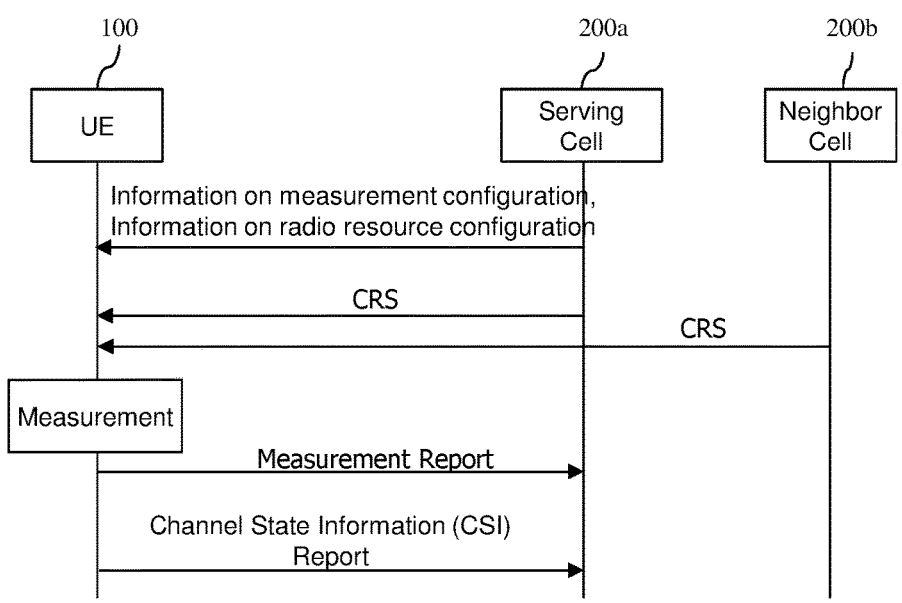
FIG. 10 illustrates a measurement and a measurement report procedure.

FIG. 10 Illustrates a Measurement and a Measurement Report Procedure.

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is frequently called radio resource management (RRM).

Meanwhile, the UE 100 monitors downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to 10% error of PDCCH transmission by taking into consideration a PCFICH error. The threshold Qin is defined as a level in which downlink may be very significantly reliable compared to the threshold Qout, and corresponds to 2% error of PDCCH transmission by taking into consideration a PCFICH error.

As may be seen with reference to FIG. 10, when a serving cell 200a and a neighbor cell 200b transmits a respective CRS (Cell-specific Reference Signal) to the UE 100, the UE 100 performs measurement through the CRS and transmits an RRC measurement report message, including a measurement result, to the serving cell 200a.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): This indicates reception power measured in the entire band. The RSSI includes all of a signal, interference, and thermal noise.

3) RSRQ (reference symbol received quality): This indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

The RSRQ may be calculated as an RSSI/RSSP.

Meanwhile, the UE 100 receives a measurement configuration (hereinafter also called "measconfing") information element (IE) from the serving cell 100 a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement result is called as a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell, and the inter-frequency measurement target may indicate a neighbor cell having a frequency band different from that of a serving cell, and the inter-RAT measurement target may indicate a neighbor cell having an RAT different from the RAT of a serving cell.

Specifically, the measurement configuration IE (Information Element) includes an IE, such as the following Table.

TABLE 3

| |
|---|
| MeasConfig ::= |
| -- Measurement objects |
|     measObjectToRemoveList |
|     measObjectToAddModList |
| -- Other parameters |
|     measGapConfig |

The Measurement objects IE includes measObjectToRemoveList indicative of a list of measObject to be removed and measObjectToAddModList indicative of a list that may be newly added or modified.

Meanwhile, the measGapConfig is used to configure or release the measurement gap (MG). The measurement gap (MG) is a duration to perform a cell identification or a RSRP measurement on an inter frequency different from a frequency of the serving cell.

In the measObject, MeasObjectCDMA2000, MeasObjectEUTRA, and MeasObjectGERAN etc. are included in accordance with communication technology.

Meanwhile, the MeasObjectEUTRA IE includes information applied for an inter-frequency an intra-frequency for an E-UTRA cell measurement. The MeasObjectEUTRA IE is illustrated in the following Table.

TABLE 4

MeasObjectEUTRA field explanation
MeasObjectEUTRA field explanation
carrierFreq
Identifies an E-UTRA carrier frequency for which the configuration is valid
neighCellConfig
Indicates configuration information of a neighboring cell.
measCycleSCell
Parameter: $T_{measure\_scc}$
The parameter indicates a measurement cycle of a deactivated secondary cell (Scell).
The parameter is used when the secondary cell (Scell) is operated with a frequency indicated in the measObject, and it is in a deactivated state.
An E-UTRAN provides the parameter whenever the secondary cell (Scell) is configured with the frequency indicated in the measObject. A value of the parameter may indicate 160 subframes, 256 subframes, 320 subframes, 512 subframes, 640 subframes, 1024 subframes, and 1280 subframes.
measSubframeCellList
list of cells to which the measSubframePatternNeigh is applied
If it is not included, a UE assumes that a time domain measurement resource restriction pattern has been applied for all neighboring cell.
measSubframePatternNeigh
The time domain measurement resource restriction pattern which is applied to measure RSRP and RSRQ for a neighboring cell on a carrier frequency indicated in the carrierFreq The measurement cycle of the deactivated secondary cell (Scell), i.e. the measCycleSCell is used for saving a power of UE, if the secondary cell (Scell) is configured, but it is deactivated. Accordingly, the UE performs a measurement once for any one cycle of 160 subframes, 256 subframes, 320 subframes, 512 subframes, 640 subframes, 1024 subframes, and 1280 subframes, indicated in the measCycleSCell.

Meanwhile, the UE 100 receives a radio resource configuration (RRC) information element (IE) as shown.

The radio resource configuration (RRC) dedicated information element (IE) is used to configure/modify/release a radio bearer, or modify a MAC configuration etc. The radio resource configuration IE includes subframe pattern information. The subframe pattern information is information on a measurement resource restriction pattern in a time domain to measure the RSRP, and the RSRQ for the serving cell (e.g. a primary cell).

Figure 11:
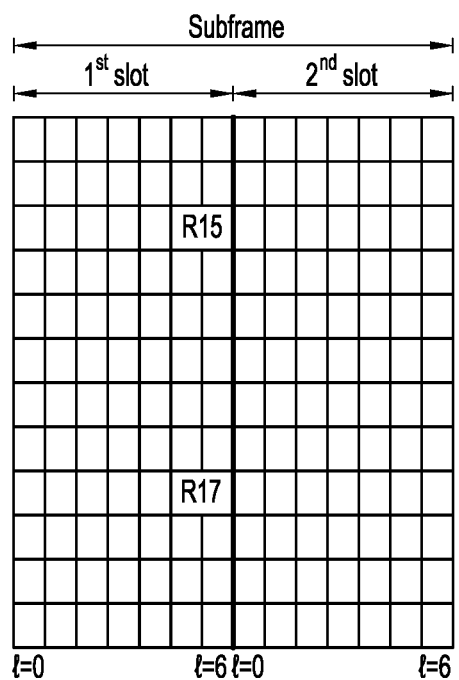
FIG. 11 illustrates an exemplary RB to which a CSI-RS of reference signals is mapped.
Figure 11:
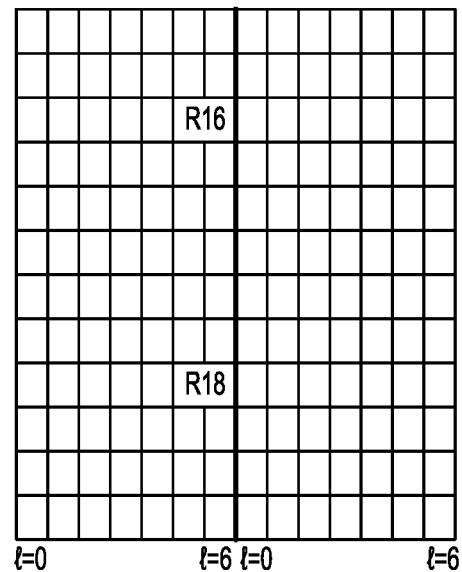
Figure 11:
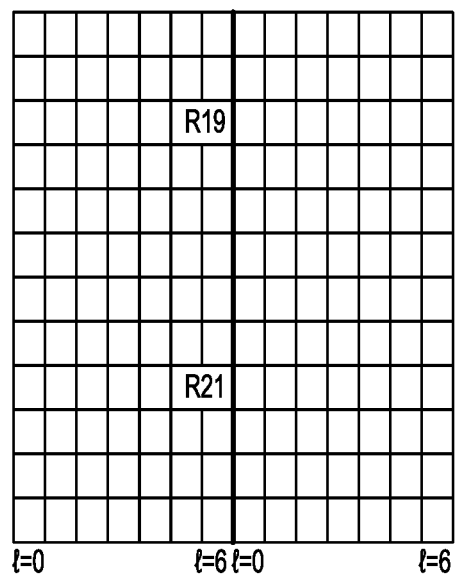
Figure 11:
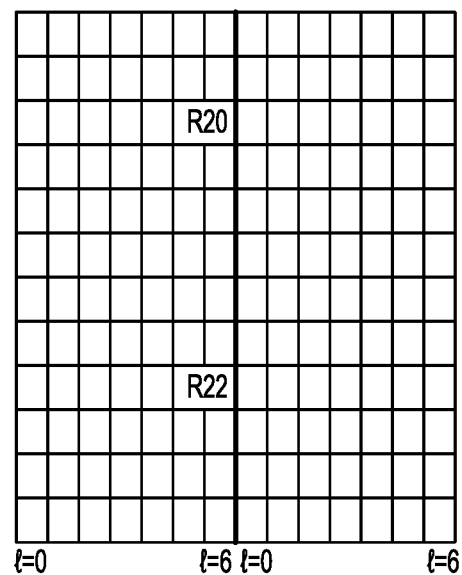

FIG. 11 Illustrates an Exemplary RB to which a CSI-RS of Reference Signals is Mapped.

A CSI-RS is used for channel measurement for the channel estimation and channel information of the PDSCH of LTE-A UE. The CSI-RS is deployed relatively sparsely in a frequency domain or time domain and may be punctured in the data region of a subframe or MBSFN subframe. If it is required to estimate a CSI, a CQI, PMI, and RI may be reported by UE.

The CSI-RS is transmitted through a 1, 2, 4, or 8 antenna ports. Antenna ports used in this case are p=15, p=15, 16, p=15, . . . , 18, and p=15, . . . , 22. That is, the CSI-RS may be transmitted through 1, 2, 4, 8 antenna ports. The CSI-RS may be defined with respect to only a subcarrier duration $\Delta f$=15 kHz. For the CSI-RS, reference may be made to Paragraph 6.10.5 of 3GPP (3rd Generation Partnership Project) TS 36.211 V10.1.0 (March 2011) "Technical Specification Group Radio Access Network; Evolved Universal Terrestrial Radio Access (E-UTRA); Physical channels and modulation (Release 8)."

In the transmission of the CSI-RS, a maximum of 32 different configurations may be proposed in order to reduce ICI (inter-cell interference) in a multi-cell environment including a heterogeneous network (HetNet) environment. The CSI-RS configuration is different depending on the number of antenna ports within a cell and a CP, and a neighbor cell may have a different configuration to the greatest extent. Furthermore, the CSI-RS configuration may be divided into a case where it is applied to both an FDD frame and TDD frame and a case where it is applied to only a TDD frame depending on a frame structure. In a single cell, a plurality of CSI-RS configurations may be used. A zero or one CSI-RS configuration may be used for UE that assumes a non-zero power CSI-RS, and zero or some CSI-RS configurations may be used for UE that assumes a zero power CSI-RS.

Meanwhile, FIG. 11 illustrates resource elements used for CSI-RS when a CSI-RS configuration index is 0 in a normal CP structure. Rp illustrates a resource element used for CSI-RS transmission on an antenna port p. Referring to FIG. 11, a CSI-RS for antenna ports 15 and 16 is transmitted through resource elements corresponding to the third subcarrier (i.e., subcarrier index 2) of the sixth and the seventh OFDM symbols (i.e., OFDM symbol indices 5, 6) of a first slot. A CSI-RS for antenna ports 17 and 18 is transmitted through resource elements corresponding to the ninth subcarrier (i.e., subcarrier index 8) of the sixth and the seventh OFDM symbols (OFDM symbols indices 5, 6) of the first slot. A CSI-RS for antenna ports 19 and 20 is transmitted through the same resource elements as those in which the CSI-RS for the antenna ports 15 and 16 is transmitted. The CSI-RS for the antenna ports 21 and 22 is transmitted through the same resource elements as those in which the CSI-RS for the antenna ports 17 and 18 are transmitted.

If the CSI-RS through eight antenna ports is transmitted to UE, the UE may receive an RB to which R15 to R22 has been mapped. That is, the UE may receive a CSI-RS having a specific pattern.

Meanwhile, a small cell is described below.

<Introduction of Small Cell>

Meanwhile, in the next-generation mobile communication system, it is expected that a small cell having a small coverage radius will be added to the coverage of an existing cell and a small cell may process more traffic. The existing cell is called a macro cell because it has greater coverage than the small cell. This is described below with reference to FIG. 7.

Figure 12:
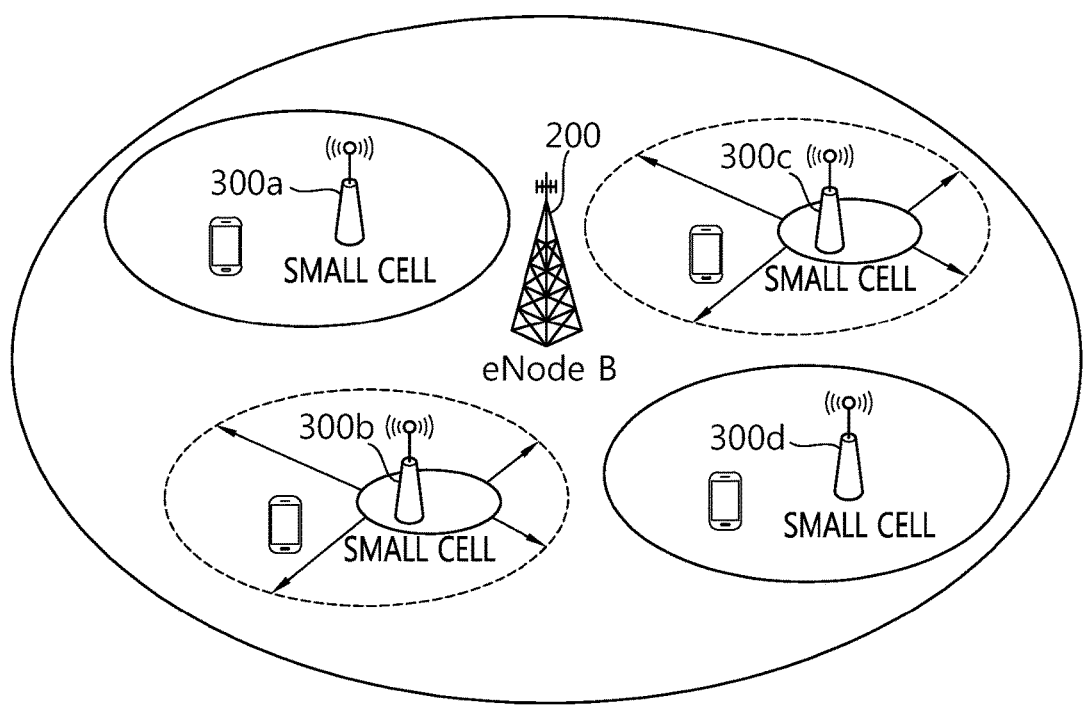
FIG. 12 is a diagram illustrating a heterogeneous network environment in which a macro cell and small cells having a possibility that they may become the next-generation wireless communication system are mixed.

FIG. 12 is a Diagram Illustrating a Heterogeneous Network Environment in which a Macro Cell and Small Cells Having a Possibility that they May Become the Next-Generation Wireless Communication System are Mixed.

Referring to FIG. 12, a macro cell according to an existing eNodeB 200 has a heterogeneous network environment in which overlaps with small cells according to one or more small eNodeBs 300a, 300b, 300c, and 300d. The existing eNodeB is also called a macro eNodeB (MeNB) because it provides coverage greater than the small eNodeB. In this specification, a macro cell and a macro eNodeB are interchangeably used. UE connected to the macro cell 200 may be called macro UE. The macro UE receives a downlink signal from a macro eNodeB and sends an uplink signal to a macro eNodeB.

In such a heterogeneous network, the coverage gap of a macro cell may be filled by configuring the macro cell as a primary cell (Pcell) and configuring the small cell as a secondary cell Scell. Furthermore, overall performance can be boosted by configuring a small cell as a primary cell (Pcell) and configuring a macro cell as a secondary cell Scell.

Meanwhile, if the small cell is deployed as described above, an inter-cell interference problem may be worsened. In order to solve this problem, as illustrated in FIG. 12, the coverage size of the small cell may be reduced depending on its situation. Alternatively, the small cell may be off and then on depending on the situation.

Figure 13:
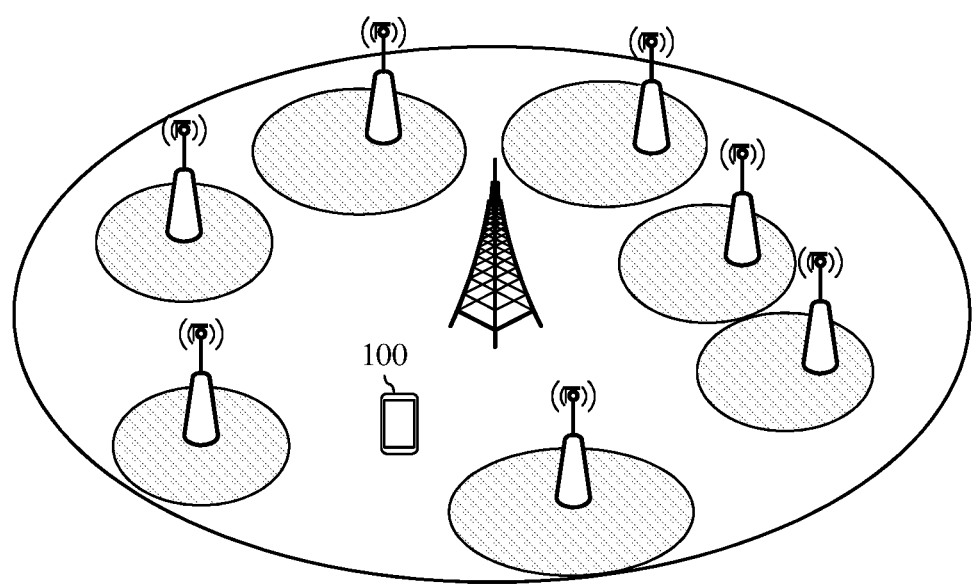
FIG. 13 is an exemplary diagram illustrating the situation in which small cells have been densely deployed.

FIG. 13 is an exemplary diagram illustrating the situation in which small cells have been densely deployed.

Referring to FIG. 13, illustrated is the state in which small cells have been densely deployed within the coverage of a macro cell. In this state, it may be difficult for UE 100 to detect the small cells within a short time. In particular, as described above, cell detection is performed through the reception of a PSS/SSS. However, if many small cells send PSS/SSSs at the same timing, that is, on subframes Nos. 0 and 5, it may be difficult for the UE 100 to receive all the PSS/SSSs at once. Furthermore, if the small cells send the PSS/SSSs on the subframes Nos. 0 and 5 at the same time, mutual interference may be generated. As a result, it may be difficult for the UE 100 to correct receive the PSS/SSSs.

In order to solve the problem, the small cell may transmit a new discovery signal (DS) in addition to the existing PSS/SSS. Hereinafter, it will be explained by referring to FIG. 14.

Figure 14:
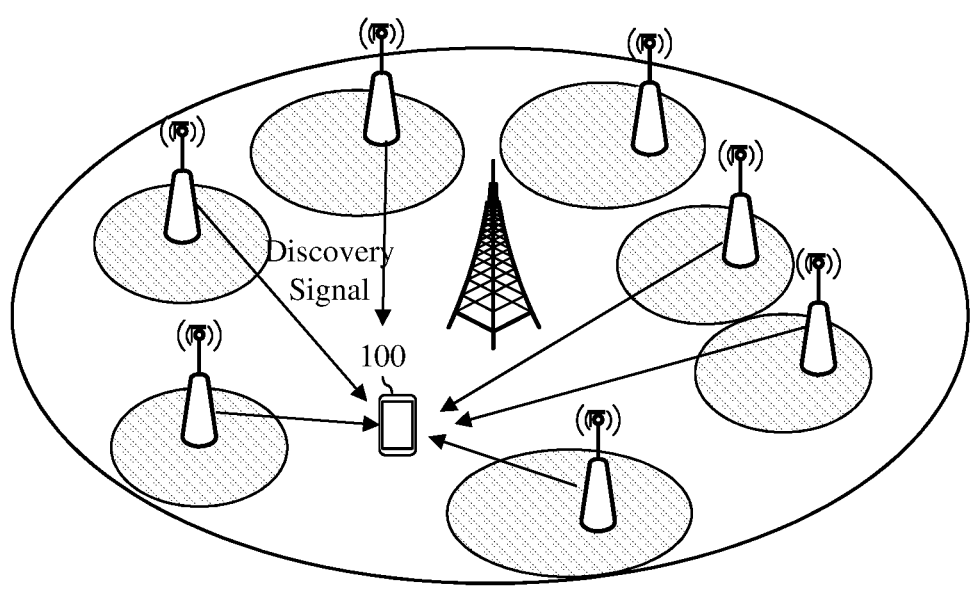
FIG. 14 illustrates an example in which the small cell transmits a discovery signal.

FIG. 14 Illustrates an Example in which the Small Cell Transmits the Discovery Signal.

As may be seen with reference to FIG. 14, in order for UE to efficiently detect small cells, the small cell sends a new discovery signal (DS) in addition to an existing PSS/SSS. The discovery signal may be periodically transmitted even from the small cell of which a state is off.

The discovery signal may also be called a discovery reference signal (DRS). Accordingly, the UE needs to perform a cell search process or cell detection process using the discovery signal in addition to the existing PSS/SSS.

Figure 15:
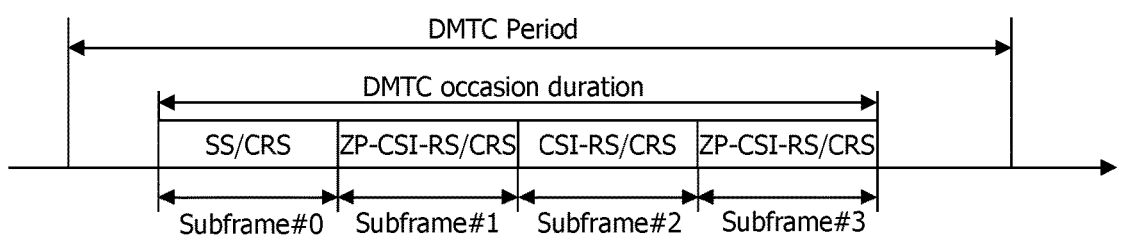
FIG. 15 illustrates an example of the discovery signal.

FIG. 15 Illustrates an Example of the Discovery Signal.

As may be seen with reference to FIG. 15, the discovery signal (DS) may be a combination of the followings.

CRS of antenna port 0 during a DwPTS of all downlink subframe and special subframe.
PSS on the first subframe of a period in a frame type 1 for the FDD or PSS on the second subframe of a period in a frame type 2 for the TDD
SSS on the first subframe in a period
None-zero power CSI-RS on zero or one or more subframe in the period That is, the discovery signal (DS) may be a combination of the CRS, SS (i.e. PSS and SSS), and the CSI-RS.

Meanwhile, as shown in FIG. 15, an occasion duration of the discovery signal (DS) is as follows.

Continuous subframe of which a number is one through five, in the frame type 1 for the FDD.
Continuous subframe of which a number is two through five, in the frame type 2 for the TDD.

Meanwhile, the UE may receive, from an eNB, a discovery signal measurement timing configuration (DMTC) which is timing information for a discovery signal based measurement. The DMTC may be received in the MeasDS-Config field illustrated in the following table. The MeasDS-Config field may be received to be included in the Measurement objects illustrated in the Table 3. That is, the MeasDS-Config field in which the DMTC is defined, may be received to be included in the Measurement objects in a measurement configuration (MeasConfig) illustrated in the Table 3, The UE does not consider that a transmission of the discovery signal has been sent on a subframe which is not defined in the DMTC.

TABLE 5 explanation of the MeasDS-Config field
csi-RS-IndividualOffset
CSI-RS individual offset applicable to a specific CSI-RS resource
dmtc-PeriodOffset
This means a dmtc-Periodicity and a dmtc-offset for a given frequency. The DMTC Periodicity may be 40ms, 80ms, and .... The DMTC offset is represented as the number of the subframe. The occasion duration of the DMTC is 6ms.
ds-OccasionDuration
This means the occasion duration of the discovery signal for a given frequency. The occasion duration of the discovery signal is common to all cells which transmits the discovery signal on the given frequency.
physCellId
This means a physical cell ID. The UE assumes that the CSI-RS and the PSS/SSS/CRS corresponding to the physical cell ID is quasi co-located for a mean delay and a Doppler shift.
resourceConfig
This means the CSI-RS configuration.
subframeOffset
This means a subframe offset between the SSS and the CSI-RS of a cell identified by the physical cell ID in the discovery signal occasion.

In the above table, the dmtc-Periodicity is a periodicity of measurement, and may indicate one of 40 ms, 80 ms, and 160 ms. In accordance with the periodicity, for example, the UE may perform a measurement once for every 160 ms based on the discovery signal (DS). The ds-OccasionDuration is the occasion duration of the discovery signal, and indicates the appropriate number of subframe of continuous subframe of one through five for the case of FDD, and indicates the appropriate number of subframe of continuous subframe of two through five for the case of TDD. For example, if the dmtc-Periodicity is 160 ms, and the occasion duration of the DMTC is 6 ms, the UE measures the discovery signal from the small cell for 6 ms.

Meanwhile, the above mentioned description of the small cell is summarized as follows.

The discovery signal and the measurement duration are newly defined for a cell identification and measurement of the small cell. The UE uses a discovery signal measurement timing configuration (DMTC) received from the serving cell for the cell identification and measurement of the small cell. The occasion duration of the DMTC is 6 ms and the DMTC periodicity indicates one of 40 ms, 80 ms, and 160 ms. That is, the UE performs detecting and measuring in the small cell within 6 ms of the DMTC occasion duration. According to the occasion duration of the discovery signal (DS), if the discovery signal (DS) is FDD, it may be received on one through five continuous subframes, and if it is FDD, it may be received on two through five continuous subframes. The SSS and the CRS is received on the first one of the subframes, and the PSS is further received for the case of FDD. The PSS is received on the second one of the subframes for the case of TDD.

The small cell may be on/off, and the UE detects a cell and performs a measurement by always using the discovery signal, regardless of an on/off state of the small cell, since it may not previously obtain information on whether the small cell is in the on state or off state.

The discovery signal has a purpose of a synchronization acquisition with the PSS/SSS, a CRS based RSRP measurement, a CSI-RS acquisition, and a CSI-RS based RSRP measurement.

The occasion duration of the discovery signal includes one through five continuous subframes for the case of FDD and includes two through five continuous subframes for the case of TDD.

As explained above, the SSS/CRS is received on the first subframe in the occasion duration of the discovery signal, the CSI-RS is received at a position distanced by the value of the subframeoffset from the SSS subframe.

Figure 16:
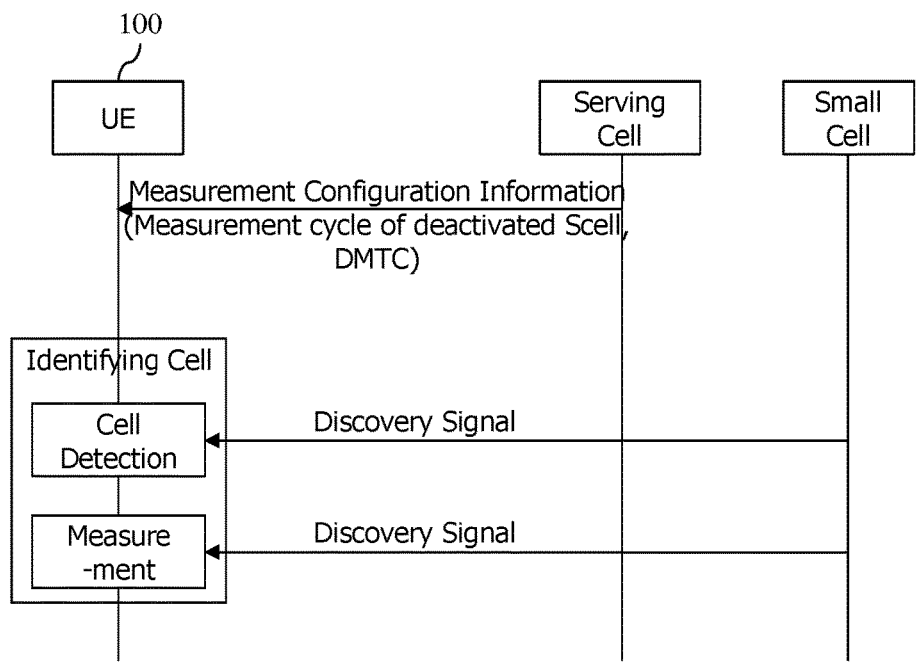
FIG. 16 is an exemplary diagram illustrating a measurement process based on the discovery signal.

FIG. 16 is an Exemplary Diagram Illustrating a Measurement Process Based on the Discovery Signal.

As may be seen with reference to FIG. 16, a UE 100 receives measurement configuration information from a serving cell (e.g. primary cell). In this case, the measurement configuration information may be the measconfig illustrated in the table 3.

The measurement configuration information, i.e. a Measurement object in the measconfig may include a discovery signal measurement timing configuration (DMTC) (i.e. the MeasDS-Config illustrated in the table 6) for the neighboring small cell. The DMTC, i.e. the MeasDS-Config, may include information on DMTC periodicity (dmtc-Periodicity), duration of the DMTC occasion, occasion duration of the discovery signal, as illustrated in the table 3.

Further, the measurement configuration information, i.e. the Measurement object in the measconfig, may include a measurement cycle (i.e., measCycleSCell illustrated in the table 4) of deactivated secondary cell (Scell).

The UE 100 detects the small cell based on the discovery signal, and perform a measurement based on the discovery signal, and thus may identify the cell.

However, as for a cell identification time on how long it should take for a UE to finish the cell identification, it has conventionally been researched only on a basis of a general secondary cell (Scell).

According to the existing research, based on whether a discontinuous reception (DRX) has been used, the UE defines the cell identification time as follows.

i) When No DRX is in Use

When no DRX is in use, the UE shall be able to identify a new detectable FDD or TDD cell on the secondary component carrier within $T_{identify\_scc}$. In this case, $T_{identify\_scc}$=20 measCycleSCell.

ii) When DRX is in Use

When DRX is in use, the UE shall be able to identify a new detectable FDD or TDD cell on the secondary component carrier within $T_{identify\_scc}$. In this case, $T_{identify\_scc}$ max(20 measCycleSCell, $T_{idenify\_scc1}$). In this case, $T_{identify\_scc1}$ is defined as the following table.

TABLE 6

| DRX cycle length (s) | $T_{identify\_scc1}$ (s) (DRX cycles) |
|---|---|
| ≤0.04 | 0.8 (the number of cycle of DRX) |
| 0.04 < DRX-cycle ≤ 0.08 | 40, as a time based on the DRX cycle in use |
| 0.128 | 3.2 (25) |
| 0.128 < DRX-cycle ≤ 2.56 | 20, as a time based on the DRX cycle in use |

The DRX cycle length is received via a higher layer signalling.

However, when detecting a small cell based on the discovery signal, it has not yet researched for the cell identification time. In other words, it has not yet researched on the cell identification time on how long it should take for the UE 100 to finish detecting the small cell based on the discovery signal.

<Proposal of the Present Specification>

The present specification proposes the cell identification time for which the small cell should be identified based on the discovery signal, when the small cell is configured for the secondary cell (Scell) as follows.

i) When No DRX is in Use

When no DRX is in use, the UE should identify the small cell on the secondary component carrier within max (20*measCycleSCell, N*DRS_Periodicity). That is, the UE should identify the small cell on the secondary component carrier within a greater time duration of the 20*measCycleSCell, and N*DRS_Periodicity. For example, if the N*DRS_Periodicity is greater than 20*measCycleSCell, the UE should identify the small cell within the N*DRS_Periodicity.

In this case, the DRS_Periodicity is a DMTC periodicity (dmtc-Periodicity), and it is one of 40 ms, 80 ms, and 160 ms. As N is multiples of the DMTC periodicity (dmtc-Periodicity), and it is an integer defined by an actual environment and simulation.

For example, if the measCycleScell=160 ms, N=3, DRS_Periodicity=40 ms, the cell identification time becomes 20*160=3200 msc ii) When DRX is in Use When no DRX is in use, and a frequency of the small cell as the secondary cell (Scell) has a relationship with an intra-frequency of a frequency of the primary cell (that is, the secondary cell and the primary sell are operated in a similar frequency band), the UE should identify the small cell within max (20*measCycleSCell, $T_{identify\_intra\_SCE}$). That is, the UE should identify the small cell within a greater time duration of the 20*measCycleSCell, and $T_{identify\_intra\_SCE}$. For example, if the $T_{identify\_intra\_SCE}$ is greater than the 20*measCycleSCell, the UE should identify the small cell within the $T_{identify\_intra\_SCE}$.

In this case, $T_{identify\_intra\_SCE}$ is the cell identification time in small cell enhancement, and it may be defined as follows, by comparing DRS_Periodicity (i.e., DMTC periodicity (dmtc-Periodicity)) with the DRX cycle length.

$$T_{identify\_intra\_SCE}=N*\max(DRS\_Periodicity, DRX\ cycle\ length)+T_{Measurement\_Period\_Intra\_SCE}.$$

In this case, $T_{Measurement\_Period\_Intra\_SCE}$ is a time for the small cell measurement, and it is defined as follows.

$$T_{Measurement\_Period\_Intra\_SCE}=\max(M*DRS\_Periodicity, 5*measCycleSCell).$$

In this case, N and M is an integer value defined on a basis of actual environment and simulation.

When no DRX is in use, and a frequency of the small cell as the secondary cell (Scell) has a relationship with an inter-frequency of a frequency of the primary cell (that is, the secondary cell and the primary sell are operated in different frequency bands), the UE should identify the small cell within max (20*measCycleSCell, $T_{identify\_inter\_SCE}$). That is, the UE should identify the small cell within a greater time duration of the 20*measCycleSCell, and $T_{indentify\_inter\_SCE}$. For example, if the $T_{identify\_inter\_SCE}$ is greater than the 20*measCycleSCell, and UE should identify the small cell within the $T_{identify\_inter\_SCE}$.

In this case, $T_{identify\_inter\_SCE}$ is the cell identification time in small cell enhancement, and it may be defined as follows, by comparing DRS_Periodicity (i.e., DMTC periodicity (dmtc-Periodicity)) with the DRX cycle length.

$$T_{identify\_inter\_SCE} = N*\max(DRS\_Periodicity, DRX\ cycle\ length) + T_{Measurement\_Period\_Inter\_SCE}$$

In this case, $T_{Measurement\_Period\_Inter\_SCE}$ is a time for the small cell measurement, and it is defined as follows.

$$T_{Measurement\_Period\_Inter\_SCE} = \max(M*DRS\_Periodicity, 5*measCycleSCell).$$

In this case, N and M is an integer value defined on a basis of actual environment and simulation.

The above mentioned embodiments of the present invention may be implemented by various means. For example, embodiments of the present invention may be implemented by hardware, firmware, software, or combinations thereof. Specifically, embodiments of the present invention will be explained by referring to the following diagram.

Figure 17:
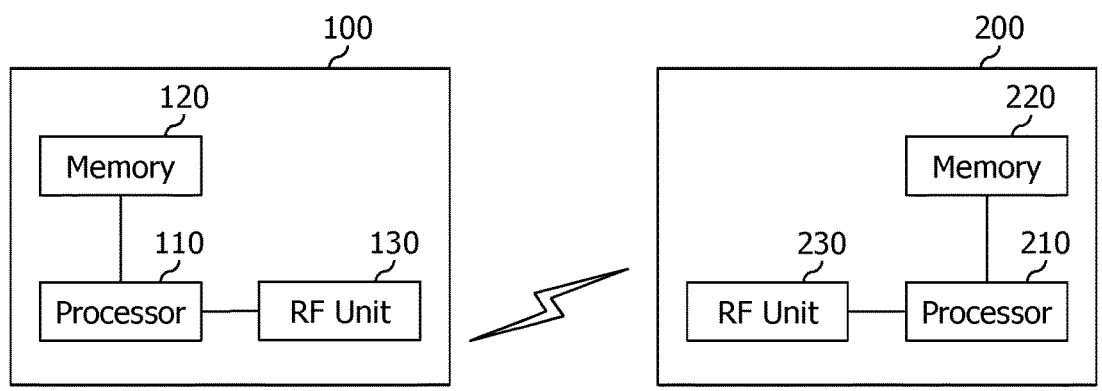
FIG. 17 is a block diagram illustrating a wireless communications system in which the disclosure of the present specification is implemented.

FIG. 17 is a block diagram illustrating a wireless communications system in which the disclosure of the present specification is implemented.

A BS 200 includes a processor 201, a memory 202 and an RF (radio frequency) unit 203. The memory 202 is connected to the processor 201, and stores various information for driving the processor 201. The RF unit 203 is connected to the processor 201, and transmits and/or receives radio signals. The processor 201 implements proposed functions, processes and/or methods. In the above mentioned embodiment, the operation of the BS 50 can be implemented by the processor 201.

A UE 100 includes a processor 101, a memory 102 and an RF unit 103. The memory 102 is connected to the processor 61, and stores various information for driving the processor 101. The RF unit 103 is connected to the processor 101, and transmits and/or receives radio signals. The processor 101 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method performed by a User Equipment (UE) for identifying a cell based on a discovery signal, the method comprising:
   receiving, from a serving cell, a discovery signal measurement timing configuration (DMTC) and information on a measurement cycle,
   wherein the DMTC includes a DMTC periodicity,
   wherein the information on the measurement cycle specifies a cycle of subframes for measuring a secondary cell (Scell) which is deactivated; and
   identifying the secondary cell;
   wherein if a discontinuous reception (DRX) is not used, the secondary cell is identified within a first time duration which is based on the measurement cycle,
   wherein, if the DRX is used, if the secondary cell corresponds to an intra-frequency, and if the secondary cell is identified by using the discovery signal, the secondary cell is identified within a second time duration, $T_{identify\_intra}$,
   wherein $T_{identify\_intra} = N*\max(DMTC\ periodicity, a\ length\ of\ DRX\ cycle)\ T_{Measurement\_Period\_Intra}$,
   wherein the $T_{measurement\_Period\_Intra}$ is a duration for a measurement on the intra-frequency, and
   wherein the N is an integer.

2. The method of claim 1, wherein the identifying of the cell includes detecting and measuring the cell.

3. The method of claim 1, wherein the DMTC periodicity corresponds to one of 40 ms, 80 ms and 160 ms.

4. The method of claim 1, wherein the discovery signal includes one or more of a primary synchronization signal (PSS), a secondary synchronization signal (SSS), a cell-specific reference Signal (CRS) and a channel state information reference signal (CSI-RS).

5. The method of claim 1, wherein the first time duration is expressed as $T_{identify\_scc}$, and
   wherein $T_{identify\_scc} = 20*$the measurement cycle.

6. The method of claim 1, wherein the measurement cycle specifies at least one cycle of 160 subframes, 256 subframes, 320 subframes, 512 subframes, 640 subframes, 1024 subframes and 1280 subframes.

7. A terminal for identifying a cell based on a discovery signal, the terminal comprising:
   a transceiver configured to receive, from a serving cell, a discovery signal measurement timing configuration (DMTC) and information on a measurement cycle,
   wherein the DMTC includes a DMTC periodicity,
   wherein the information on the measurement cycle specifies a cycle of subframes for measuring a secondary cell (Scell) which is deactivated; and
   a processor operatively coupled to the transceiver and configured to identify the secondary cell;
   wherein if a discontinuous reception (DRX) is not used, the secondary cell is identified within a first time duration which is based on the measurement cycle,
   wherein, if the DRX is used, if the secondary cell corresponds to an intra-frequency, and if the secondary cell is identified by using the discovery signal, the secondary cell is identified within a second time duration, $T_{identify\_intra}$,
   wherein $T_{identify\_intra} = N*\max(DMTC\ periodicity, a\ length\ of\ DRX\ cycle) + T_{measurement\_Period\_Intra}$,
   wherein the $T_{measurement\_Period\_Intra}$ is a duration for a measurement on the intra-frequency, and
   wherein the N is an integer.

8. The terminal of claim 7, wherein the identifying of the cell includes detecting and measuring the cell.

9. The terminal of claim 7, wherein the DMTC periodicity corresponds to one of 40 ms, 80 ms and 160 ms.

10. The terminal of claim 7, wherein the discovery signal includes one or more of a primary synchronization signal (PSS), a secondary synchronization signal (SSS), a cell-specific reference Signal (CRS) and a channel state information reference signal (CSI-RS).

11. The terminal of claim 7, wherein the first time duration is expressed as $T_{identify\_scc}$, and wherein $T_{identify\_scc}$=20*the measurement cycle.

12. The terminal of claim 7, wherein the measurement cycle specifies at least one cycle of 160 subframes, 256 subframes, 320 subframes, 512 subframes, 640 subframes, 1024 subframes and 1280 subframes.

* * * * *